United States Patent [19]

Smith et al.

[11] Patent Number: 4,632,691
[45] Date of Patent: Dec. 30, 1986

[54] COMPLEXLY CURVED MOLD

[76] Inventors: Quintin R. Smith, 317 E. Fourth St.; Kellen R. Smith, 760 Brokate Rd., both of Port Clinton, Ohio 43452

[21] Appl. No.: 811,544

[22] Filed: Dec. 20, 1985

[51] Int. Cl.$^4$ .......................................... C03B 23/035
[52] U.S. Cl. ........................................ 65/273; 65/106; 425/457
[58] Field of Search ................ 425/457, 177; 65/273, 65/106

[56] References Cited

U.S. PATENT DOCUMENTS

| | | | |
|---|---|---|---|
| 2,744,359 | 5/1956 | Jendrisak | 65/273 |
| 3,238,031 | 3/1966 | Nikoll | 65/106 |
| 3,477,839 | 11/1969 | Misson | 65/273 |
| 4,204,854 | 5/1980 | McMaster et al. | 65/273 |
| 4,274,858 | 6/1981 | Claassen et al. | 65/273 |
| 4,277,276 | 7/1981 | Kellar et al. | 65/273 |
| 4,282,026 | 8/1981 | McMaster et al. | 65/273 |
| 4,483,702 | 11/1984 | Frank et al. | 65/273 |
| 4,522,641 | 6/1985 | Hagedorn et al. | 65/273 |
| 4,579,577 | 4/1986 | Claassen | 65/273 |

Primary Examiner—Tim Miles
Attorney, Agent, or Firm—David D. Murray

[57] ABSTRACT

A complexly curved mold and method of fabricating same provides a highly accurate form for producing complexly curved panels such as automobile lights and the like. The mold comprises a lattice-work support or grid having one surface which conforms to the desired contour of the product. The lattice-work comprises and is assembled from a plurality of strips of a material such as stainless steel or similarly relatively high strength material which are arranged in two parallel arrays disposed normal to one another and secured together to form the lattice-work support. A plurality of plates which have been shaped by rolling, bending, or other forming means to conform to areas of the mold define the face of the mold. They are secured to the lattice-work support by suitable means such as welding. The face of the mold may also include a plurality of apertures arranged in a grid through which a vacuum may be drawn to ensure intimate contact between the product and the mold face.

17 Claims, 8 Drawing Figures

COMPLEXLY CURVED MOLD

BACKGROUND OF THE INVENTION

The invention relates generally to molds for forming complexly curved products and more specifically to a mold comprising a plurality of individually formed segments which are secured to a lattice or grid type support.

The forming of a plastic, planar material such as glass into a final product such as an automobile light has been accomplished in many ways. The various processes can generally be characterized by two steps common to most: first, heating the material to a temperature sufficient to achieve a appropriate plasticity and second, conforming the material through various means such as gravity, pressure, vacuum application, and the like to a form which represents the desired final shape of the product.

In the production of lights for automobiles, this process and the apparatus utilized therein has undergone constant evolutionary change. As in many other disciplines, this change has been brought about cooperatively by ever increasing demands for complex shapes by the automotive companies and increased sophistication and capabilities of the glass forming equipment.

A significant forming technique of automobile lights and similar products is gravity forming wherein the planar product is heated to a temperature sufficient to plasticize the material, the material is placed over a form and the weight of the material itself conforms the product to the form. One of the significant disadvantages of this process is the dimensional accuracy of the finished product. Since the glass or other plastic material may not repeatedly uniformly contact the form due to variations in coefficient of friction and other process variables.

In the automotive field, increased complexity of shapes and reduced tolerances developed contemporaneously with the application of cold forming techniques. Here, heated glass is pressed between male and female mold sections to achieve a desired shape. The glass lights are suspended and gripped by tongs which move them into and out of the forming apparatus. Unfortunately, such tongs leave small marks on or adjacent the periphery of the light. As new techniques are developed for securing lights within vehicle bodies and the percent of a glass light exposed to view continues to increase, even peripheral tong marks have become unacceptable.

Another recent approach has been to utilize a fluid (air) bed to support the glass during forming as disclosed in U.S. Pat. No. 3,477,839. Here, a support bed comprising a plurality of vertically moveable parallel strips, includes openings through which heated air passes thereby softening and forming the glass. U.S. Pat. Nos. 4,483,702 and 4,522,641 also disclose glass molds. The former teaches a vacuum chamber having different levels of vacuum and a perforated face comprised of strips. The latter presents a mold having a flexible adjustable lattice type forming surface.

Various new processes which may be characterized as hot forming are now in use. One is described in U.S. Pat. No. 4,282,026. This patent discloses a furnace in which a light or similar glass shape is pressed by a peripheral ring into contact with a vacuum forming mold having a face which defines the desired shape of the product. The operation occurs at an elevated temperature which maintains the plasticity of the material. The vacuum and the peripheral ring ensure intimate contact between the material and the mold face. These features result in exceptional dimensional accuracy and minimum optical distorting.

The mold, since it is exposed to temperatures in the range of from 1300° F. to 1400° F., is preferably fabricated of a ceramic material. Not only are such molds massive by any production standard and therefore expensive, but they are prone to cracking and fracture. This may occur either as a result of normal production deterioration but also from accidental mishandling during transportation, setup, and teardown. Attempts to fabricate such a mold from other less costly and more durable materials have, until the present time, failed. Such attempts have centered upon the fabrication of a mold from a material such as steel. While the mold can be machined from a solid block of material, this approach is time consuming and therefore costly. One alternative is to conform a sheet of metal to the curvature of a pattern. As those familiar with sheet forming will readily appreciate, such materials generally cannot be shaped to conform to more than one curve or radius at a given location. That is, having formed the material about one axis, it is difficult to smoothly form the material into a coextensive curve about, for example, a perpendicular axis. Attempts to do so, even if marginally successful, will result in certain areas of material which are wrinkled and generally unacceptably deformed.

As light configurations become more complex, having, for example, adjacent concave and convex surfaces about parallel axes disposed between a convex surface about a perpendicular axis, the only viable molds have been those fabricated of ceramic material. Thus it is apparent that improvements in the art of construction and assembly of complexly curved forming molds are both possible and desirable.

SUMMARY OF THE INVENTION

The instant invention is a vacuum forming mold and method of fabricating same which provides a highly accurate means of forming complexly curved panels from planar material. The invention may be most readily utilized as a mold for vacuum forming, for example, glass panels into lights for automobiles and the like.

The mold comprises a grid or lattice-work support having one surface which conforms to the desired contour of the product. The lattice-work comprises a plurality of strips of material such as stainless steel or other material which are arranged in two parallel arrays disposed at right angles to one another. The strips thus form a support extending over the area of the mold to which a plurality of mold face plates or segments are secured. The plates are shaped by rolling, bending, or other forming techniques to conform to individual areas of the mold and define the face of the mold. They are secured to the lattice-work support by suitable means such as welding. Generally speaking, the more the mold surface in any given area departs from a plane, that is, the more complexly it is curved and the sharper (smaller) the radius of curvature, the smaller each plate will be and the larger will be the number of strips comprising a given area. The face of the mold may also include a plurality of apertures arranged in a grid through which a vacuum may be drawn to ensure intimate contact between the product and the mold face.

The method of fabricating the mold includes the steps of utilizing a full scale pattern or gauge of the finished product and cutting and forming a plurality of plates of metal by conventional forming techniques such as pinch rollers, a press brake, and manual means to conform to the gauge. As noted, the size of the metal plates reduces as the complexity of the curves increases and the radius of curvature decreases. A lattice-work support is also fabricated of a first and second array of parallel strips which are disposed perpendicular to one another and to the gauge surface. The lattice-work strips are then secured together by welding or other suitable fastening means and in turn, the individual formed plates are secured to the lattice-work support. The surface is then finished as desired and, if the device is to be used in a vacuum process, a grid of vacuum holes are formed in the face and a housing is secured over the lattice-work such that the vacuum may be drawn through the grid of holes.

Thus it is an object of the instant invention to provide a forming mold comprised of a lattice-work support and a plurality of mold face segments secured thereto.

It is the further object of the instant invention to provide a method of assemblying a mold of a plurality of plates secured to a lattice-work support.

It is a still further object of the instant invention to provide a mold which is durable, can be readily constructed, and is inexpensive.

It is a still further object of the instant invention to provide a mold which may be used for producing complexly curved glass lights and similar products.

Further objects and advantages of the instant invention will become apparent by reference to the following description of the preferred embodiment and appended drawings.

DESCRIPTION OF THE PREFERRED EMBODIMENTS

Figure 1:
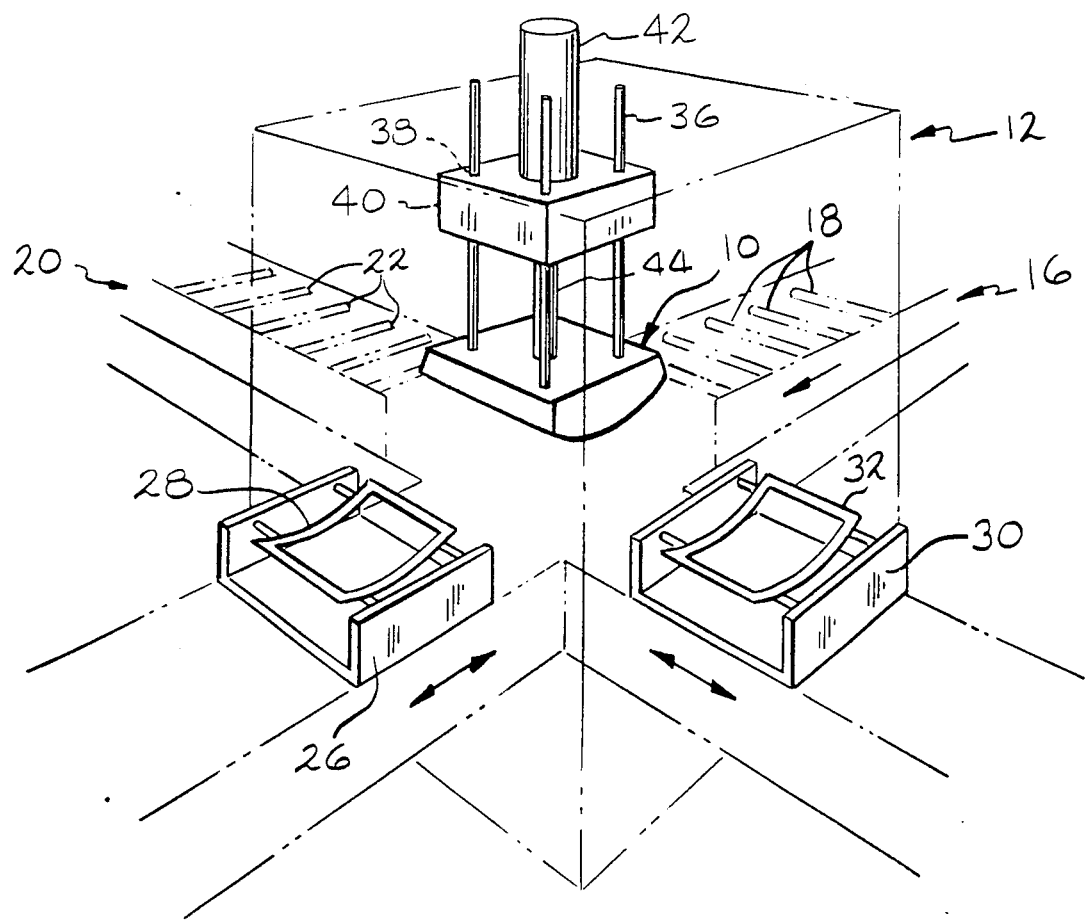
FIG. 1 is a diagrammatic perspective view of a vacuum forming mold according to the instant invention in place within a vacuum forming furnace.

Referring now to FIG. 1, a complexly curved vacuum forming mold according to the instant invention is illustrated and generally designated by the reference numeral 10. The mold 10 is illustrated in place within an oven 12 for hot forming complexly curved products from thermoplastic material such as automobile side lights and rear lights from glass. The furnace 12 includes a shroud or housing 14 which is illustrated in phantom lines and within which a suitable temperature is maintained such that the material to be formed is plastic and thus readily deformable into the desired shape. A first conveyor 16 includes a plurality of parallel rollers 18 disposed parallel to one another and perpendicular to the longitudinal axis of the first conveyor 16. The first conveyor 16 provides products for molding in the furnace 12 in a generally planar condition and thus the delivery end of the first conveyor 16 terminates within the housing 14 of the furnace 12. Disposed preferably perpendicularly to the first conveyor 16 is a second conveyor 20 which likewise includes a plurality of rollers 22 disposed parallel to one another and perpendicular to the longitudinal axis of the second conveyor 20. The second conveyor 20 extends into the housing 14 of the furnace 12 and provides an egress path for articles which had been formed by the mold 10. On the opposite side of the furnace 12 and aligned with the first conveyor 16 is a first carriage 26. The first carriage 26 is bi-directionally movable between the terminus of the first conveyor 16 within the housing 14 and a standby position illustrated in FIG. 1 which is generally external to the housing 14. The first carriage 26 supports a first frame 28. The first frame 28 is a belt or band which generally conforms to the periphery of the mold 10. On the opposite side of the furnace 12 and aligned with the second conveyor 20 is a second carriage 30. The second carriage 20 is bi-directionally movable between the terminus of the second conveyor 20 within the housing 14 and a standby position illustrated in FIG. 1 which is generally external to the housing 14. The second carriage 30 supports a second frame 32. The second frame 32 is a belt or band which generally conforms to the periphery of the mold 10.

As noted previously, the mold assembly 10 is centrally disposed within the housing 14 of the furnace 12 and is supported for vertical reciprocation by suitable stabilizing means such as a plurality of vertically extending guides 36 which are slidably received within a like plurality of parallel apertures 38 in a support member 40. Centrally disposed within the support member 40 is a vacuum duct 42 which is slidably coupled through a telecoping second vacuum duct 44 to the mold 10 to provide a vacuum within the mold 10 as will be more fully described.

In operation, the furnace 12 is maintained at 1300° F. to 1400° F. if glass is to be formed therein or other appropriate temperature which causes suitable plasticity in the formed material. The mold assembly 10 is centrally disposed within the furnace 12 and supported for reciprocation as well as connected to a vacuum source (not illustrated) through the vacuum ducts 42 and 44. Articles such as automobile lights are provided to the furnace on the first conveyor 16 and the first carriage 26 and particularly the first frame 28 is advanced into the furnace 12 and positioned adjacent the end of the conveyor 16 to receive an article (not illustrated). A transfer mechanism (not illustrated) may assist the transfer of the article from the conveyor 16 to the first frame 28. The first carriage 26 is then translated such that the first frame 28 is directly beneath the mold assembly 10. The mold assembly 10 is advanced into contact with the article on the first frame 28. Through this contact as well as the application of the vacuum, the article is conformed to the face of the mold 10. At this time the mold 10 translates away from the first frame 28 leaving the formed article unsupported but held in place by the differential pressure between the atmospheric pressure on one face and the vacuum on the opposite face. The first carriage 26 and first frame 28 then translate out of the furnace 12 and into the position illustrated in FIG. 1. Serially, the second carriage 30 and second frame 32, translate into alignment with the mold 10 and the mold 10 and second frame 32 translate together such that the second frame 32 is in contact with the periphery of the article. At this time, the vacuum is released and the article may then be removed from the face of the mold 10. The second carriage 30 then translates toward the second conveyor 20 and a transfer assembly (not illustrated) moves the article onto the second conveyor 20 and the article moves out of the furnace 12. The second carriage 28 then returns to the position illustrated in FIG. 1 and the cycle repeats.

Figure 2:
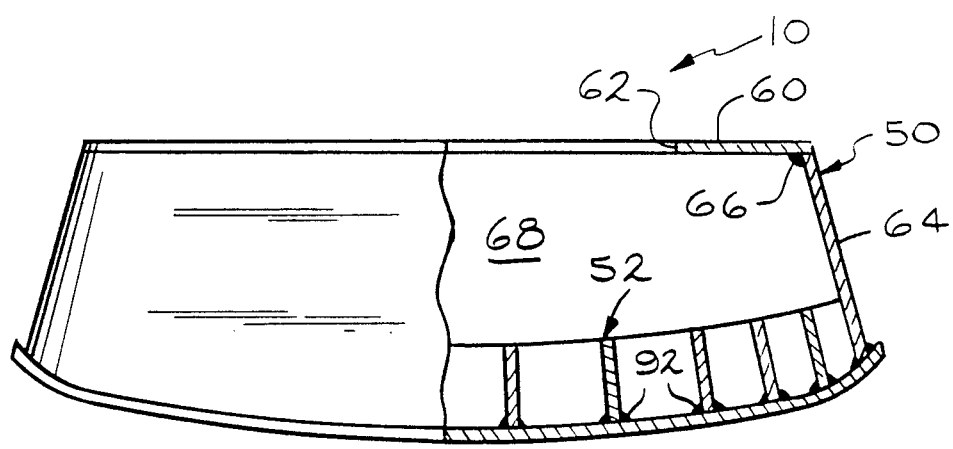
FIG. 2 is a front, elevational view with portions broken away of a curved mold according to the instant invention.
Figure 3:
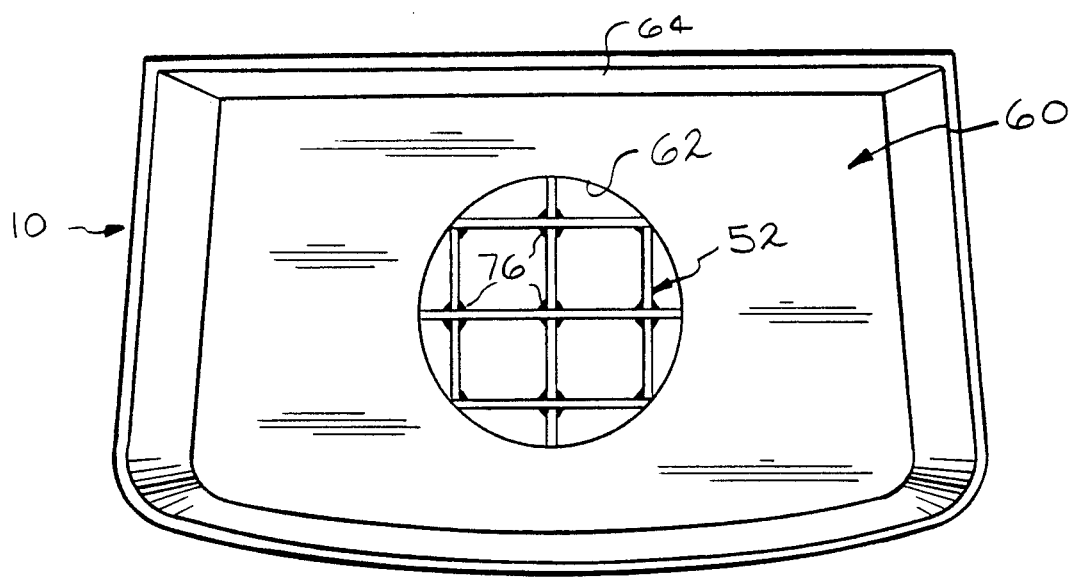
FIG. 3 is a top plan view of a curved mold according to the instant invention.

Referring now to FIGS. 2 and 3, the mold assembly 10 comprises three major elements. First of all, the mold assembly 10 includes a generally dish shaped or hollow housing 50, a lattice-type support grid 52 and a face 54. For convenience the housing 50 may conform generally to the shape of the product to be molded and may include a plurality of plates of a metal such as stainless steel which are secured together. Thus the housing 50 includes a base plate 60 defining an aperture 62 for receiving the telescoping second vacuum duct 44 and preferably, a plurality of suitably formed and oriented side plates 64. Alternatively, the side plates 64 may be combined into a unitary curved and formed component, if desired. If the side walls are a plurality of individual plates 64, they may be secured together or fastened by other suitable means such as weldments 66 as will be readily appreciated. Likewise, the ends of a unitary side wall may be welded together. It will be understood that the housing 50 defines a chamber 68 which is maintained at a reduced pressure (vacuum), provides attachment means to the associated equipment such as the guides 36 and further provides stable and secure support for the support grid 52 and the face 54.

Figure 4:
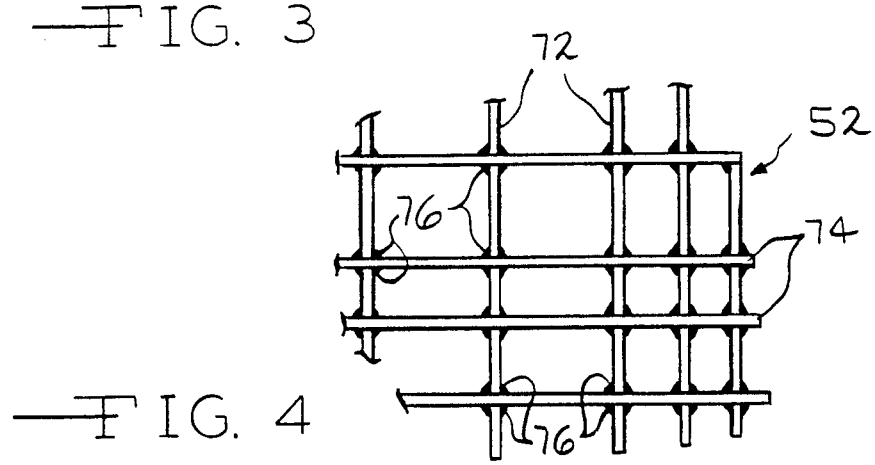
FIG. 4 is a top plan view of the support structure incorporated into a mold according to the instant invention.
Figure 6:
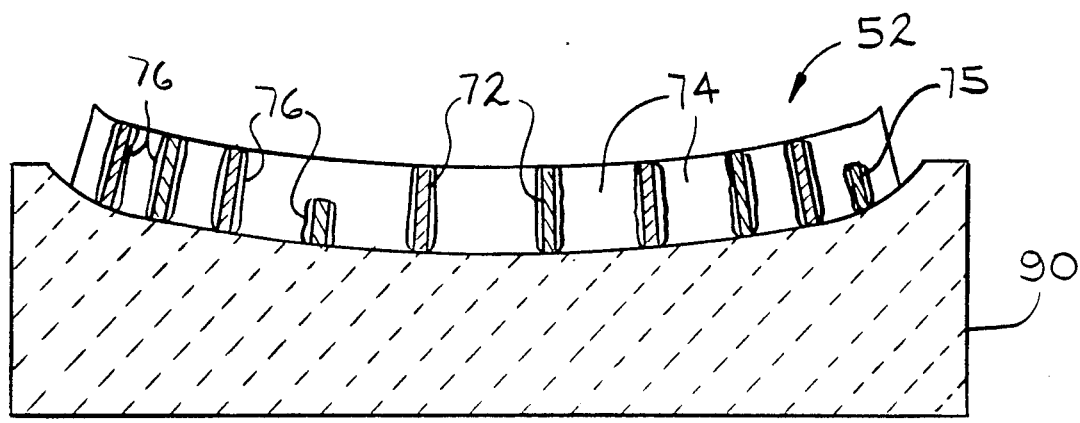
FIG. 6 is a full sectional view of the grid or lattice work support being fabricated on a female pattern or gauge.

Referring now to FIGS. 4 and 6, the support grid 52 is illustrated and comprises a first plurality of strips or webs 72 which are disposed parallel to one another and generally normal to the inside or rear surface of the face 54. Interwoven with the first plurality of webs or strips 72 is a second plurality of webs or strips 74 which are oriented parallel to one another and normal to both the first plurality of strips 72 and substantially normal to the inside surface of the face 54. The strips are preferably fabricated of stainless steel such as 304, 316 or 321 stainless steel. The preferred mode of interweaving of the plurality of strips 72 and 74 is accomplished by cutting kerfs or notches halfway through each one of the strips which form a given intersection. Alternately, one plurality of strips such as the webs or strips 72 may remain uncut throughout the entire mold 10 or through merely a portion thereof and the second plurality of strips oriented normal thereto, namely the webs or strips 74, may be cut into discontinuous sections and inserted between the first plurality of strips 72. Additionally, combinations of these two methods as well as other cutting and assemblying methods which result in the support grid illustrated in FIGS. 2 and 4 are comprehended by this invention.

The first plurality of webs or strips 72 is then secured to the second plurality of webs or strips at each intersection by weldments 76 or other suitable permanent and stable securement means. It has been found preferable to achieve the weldments 76 through utilization of the TIG (tungsten inert gas) welding technique and that at least two and preferably four of the corners at each intersection of the webs or strips 72 and 74 have weldment 76 applied thereto.

Figure 5:
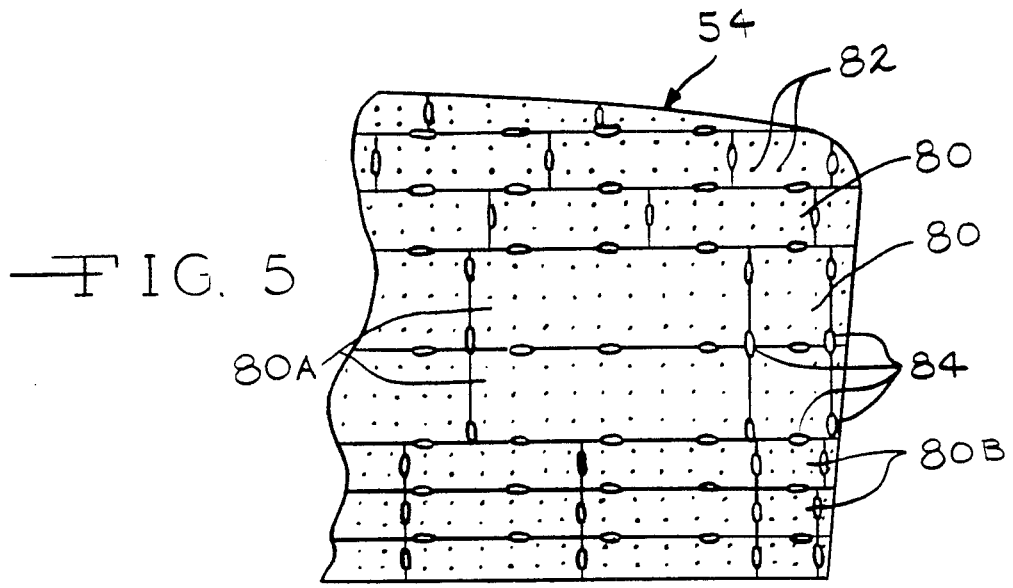
FIG. 5 is a bottom plan view of the face of a mold according to the instant invention.

Referring now to FIG. 5, the face 54 of the mold 10 is illustrated. The face 54 includes a plurality of plates 80 of various widths and lengths. Together the plates 80 define the surface against which the product or article is to be formed within the furnace 12. As such, it defines the curvature of one surface of the article. The plates 80 are preferably fabricated of 304 stainless steel and may alternately be fabricated of 316 or 321 stainless steel. One-quarter inch has been found to be a suitable thickness but thinner or thicker plates 80 may readily be utilized. Each of the plates 80 conforms to a small portion of the desired product and, as more fully discussed below, the general consideration regarding the size of any one plate 80 is that it is inversely related to the complexity of the curve or curves it will produce in the final product and thus that it must be conformed to. Therefore, it will be readily appreciated that the relatively larger plates 80A define generally flat and non-complexly curved areas whereas the relatively smaller plates 80B define areas of small radii of curvature, areas which curve about two axes at one location, that is, a saddle type curve, or both. The use of a plurality of plates 80 permits their forming into complex shapes without attendant buckling, wrinkling or bowing that would be experienced if the same forming were attempted on a single large piece of planar material. The edges of the plates 80 are preferably machined or sawed such that the edges and corners are square and unrounded. This is preferable so that when assembled, the plates abut closely ensuring that the surface of the mold face 54 is uninterrupted and smooth. The plates 80 and thus the entire face 54 define a plurality of apertures 82 uniformly distributed thereacross. The apertures 82 provide communication between the exterior of the mold face 54 and the vacuum chamber 68 thereby permitting intimate, vacuum enhanced contact between the product and the face 54 of the mold 10 to ensure proper and complete conformance of the product thereto. The plates 80 are secured to one another by weldments 84 along abutting edges.

The fabrication of the components of the mold assembly 10 and their assembly into the completed mold begins with the preparation of a female pattern or gauge 90. The female gauge 90 is a full scale, three dimensional pattern which replicates the exact curves, contours and features of one surface of the desired product. For purposes of example, the gauge 90 illustrated in FIG. 6 is somewhat simple. It will be appreciated, however, that the gauge 90 may be significantly more complex and include various curves about variously disposed axes and other shapes. The pattern or gauge 90 may be fabricated of any suitable material having appropriate workability and rigidity that it may be cut, machined or formed to the appropriate configuration. Metals, ceramics, and other materials having appropriate characteristics may thus be utilized.

A support grid 52 is then fabricated by providing through cutting or other suitable metal forming means, a first plurality of webs or strips 72 and a second plurality of webs or strips 74, one of which is illustrated in FIG. 6. As noted previously, the first plurality of webs or strips 72 are disposed perpendicularly to the second plurality of webs or strips 74. The spacing between parallel strips 72 and 74 is directly related to the curve complexity of the adjacent region of the gauge 90. That is, if the adjacent region of the gauge 90 and thus the curvature of the desired article is small or complex, i.e. saddle-like, the strips will be closer together and vice versa. At the intersections, they may be alternately cut to form interlocking junctions or one strip, either 72 or 74, may be wholly interrupted at each intersection as desired. The entire number of strips 72 and 74 are then mechanically formed through bending, sawing, grinding or any other suitable fastening means to conform to a given linearly extending profile of the surface of the gauge 90. Upon completion, each surface of the webs or strips 72 and 74 adjacent the gauge 90 is in intimate contact with the gauge 90 along substantially the full portion of its length, that is, the portion which conforms to the effective molding surface of the mold. Once positioned upon the gauge 90, the first plurality of webs or strips 72 may be secured to the second plurality of webs or strips 74 at each intersection by welding. As illustrated in FIG. 4, weldments 76 are preferably placed at each corner of an intersection such that four weldments exist at each intersection.

Figure 7:
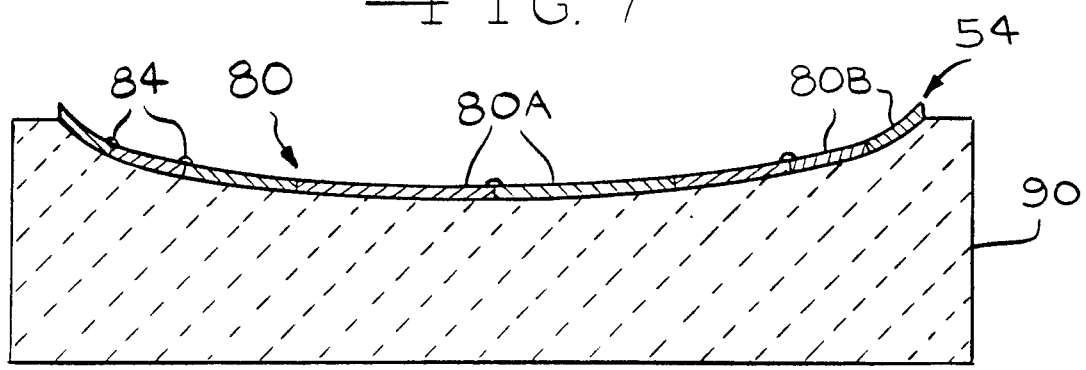
FIG. 7 is a full sectional view of the mold face being fabricated on a female pattern or gauge.

Referring now to FIG. 7, the mold face 54 is fabricated of a plurality of plates 80 in a fashion similar to the fabrication procedure of the grid 52. That is, a plurality of plates 80 having a size inversely related to the complexity of the curvature of the pattern or gauge 90 at the location in which the plate 80 will be utilized are formed preferably by cutting or machining such that the marginal edges are perpendicular and that the corners and edges are not rounded but sharp and true. Each of the plates 80 is then conformed to a given region of the gauge 90 by suitable mechanical forming means such as rolling in a pinch roller, for example, bending in a press brake, for example, hammering, twisting or other forming means known in the art. Tolerances which may be achieved in this manner and which may be enjoyed on the finished product as well are typically plus or minus 0.005 inches about the periphery of the mold 10 and plus or minus 0.015 generally toward the center of the mold 10. When the plates 80 have been suitably conformed, they may then be welded along their abutting edges at weldments 84. It has been found preferable to weld along each abutting edge one inch every three inches, though continuous welding may be utilized. Again, TIG (tungsten inert gas) welding has been found preferable for this purpose. The plates 80 are preferably fabricated of 304 stainless steel or similar materials as noted previously.

Next, a pattern of apertures 82 which provide communication between the chamber within the mold assembly 10 and the exterior surface of the face 54 are drilled in a suitable formation through the plates 80. The size of the apertures 82 and the spacing therebetween will vary with the weight of the product to be formed by the mold assembly 10 as well as the intensity of the vacuum drawn within the chamber 68 of the mold assembly 10. Typically, the pattern of the apertures 82 may be rectilinear and on one or two inch centers.

Figure 8:
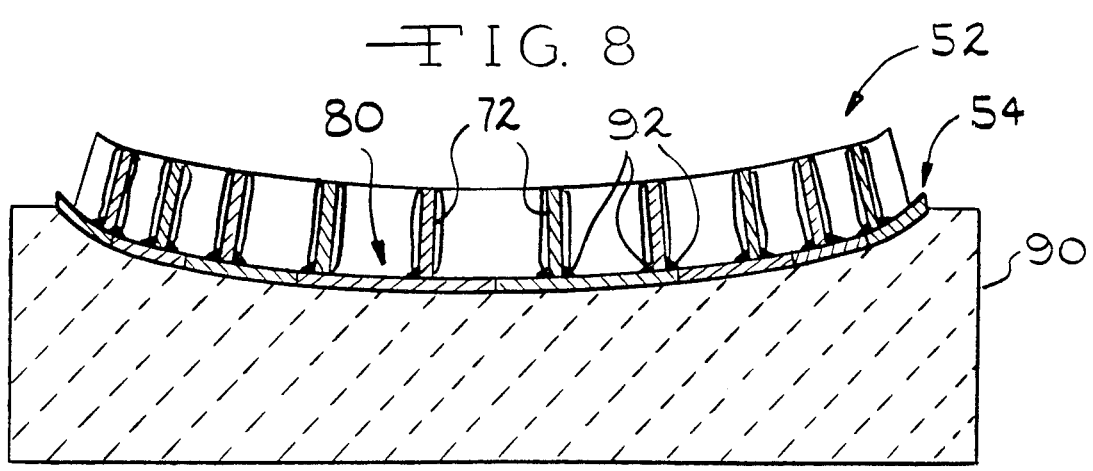
FIG. 8 is a full sectional view of the grid or lattice work support placed upon and being assembled to a mold face, the mold face in turn disposed upon a female pattern or gauge.

Referring now to FIG. 8, the plates 80 and grid 52 are then assembled to one another. It should also be noted that the previous steps of initial grid assembly and thence assembly of the face 54 may readily be interchanged as either can be first or second assembled. In either event, the plates 80 which have been secured together to form the face 54 of the mold 10 are positioned in the female gauge 90 as illustrated in FIGS. 7 and 8. Then, the support grid 52 is placed upon the back side of the plates 80 and the grid 52 is drawn tightly against the plates 80 by suitable means such as clamps. The grid 52 and the plates 80 are then secured together by weldments 92 which are again preferably placed intermittently at a spacing of one inch every three inches on one or both sides of the webs or strips 72 and 74. After the support grid 52 has been secured to the mold face 54, the side plates 64 and base plate 60 are secured together and thence to the face 54 to complete the construction of the mold assembly 10.

The mold assembly 10 may then be heat treated or annealed at approximately 1400° F. for two to three hours. Next, the top surface is machined and polished with an abrasive until appropriate smoothness and uniformity is achieved such that if, for example, the product to be formed on the mold face 54 is glass, no optical distortion will be produced thereby.

Thus, it will be apparent that a mold assembly and the method of manufacturing same disclosed herein is capable of producing highly accurate vacuum formed products which incorporate complex curvatures and configurations. The apparatus and method disclosed herein provides a mold assembly which is inexpensive to build and which reproduces with high accuracy the desired contours of a given design.

The foregoing disclosure is the best mode devised by the inventors for practicing this invention. It is apparent, however, that methods and apparatus incorporating modifications and variations will be obvious to one skilled in the art of forming molds. Inasmuch as the foregoing disclosure is intended to enable one skilled in the pertinent art to practice the instant invention, it should not be construed to be limited thereby but be construed to include such aforementioned obvious variations and be limited only by the spirit and scope of the following claims.

We claim:

1. A mold for forming plastic material into a desired shape comprising, in combination,
    a lattice-type support having a first plurality of strips and a second plurality of strips intersecting said first plurality of strips, said first and said second strips secured to one another and cooperatively conforming to a surface of such desired shape, and
    a plurality of plates secured to one another and to said lattice work support, each of said plates conforming to a portion of said surface of such desired shape.

2. The mold of claim 1 wherein said plurality of plates defines a plurality of apertures extending therethrough.

3. The mold of claim 1 wherein said strips are notched at the locations where one of said first plurality of strips intersects one of said second plurality of strips.

4. The mold of claim 1 wherein said first plurality of strips are parallel to one another.

5. The mold of claim 1 wherein said second plurality of strips are parallel to one another.

6. The mold of claim 1 wherein said first plurality of strips are parallel to one another and said second plurality of strips are perpendicular to said first plurality of strips.

7. The mold of claim 1 wherein the spacing between adjacent strips of said first and said second plurality of strips is directly related to the complexity in radius of curvature of the adjacent region of such desired shape.

8. The mold of claim 1 wherein the surface area of each one of said plurality of plates is inversely related to the complexity and radius of curvature of the portion of said surface of such desired shape it comprises.

9. The mold of claim 1 further including a housing extending from said plurality of plates and defining a chamber.

10. A mold for forming plastic materials into a desired shape comprising, in combination,
 a lattice-type support having
  a first plurality of parallel strips and
  a second plurality of parallel strips oriented perpendicularly to said first plurality of strips,
  said first and said second strips secured to one another and cooperatively conforming to a surface of such desired shape,
 a plurality of individual plates secured to one another and to said lattice-work support, each of said plates conforming to a portion of said surface of such desired shape,
 a plurality of apertures defined by said plurality of plates, and
 a housing extending from said plurality of plates, and defining a chamber including said lattice-type support.

11. A mold for forming glass in a plastic state into a desired shape comprising, in combination,
 a lattice-type support having a first plurality of strips and a second plurality of strips intersecting said first plurality of strips, said first and said second strips secured to one another and cooperatively conforming to a surface of such desired shape, and
 a plurality of plates secured to one another and to said lattice work support, each of said plates conforming to a portion of said surface of such desired shape.

12. The mold of claim 11 wherein said strips are notched at the locations where one of said first plurality of strips intersects one of said second plurality of strips.

13. The mold of claim 11 wherein said first plurality of strips are parallel to one another and said second plurality of strips are perpendicular to said first plurality of strips.

14. The mold of claim 11 wherein the spacing between adjacent strips of said first and said second plurality of strips is directly related to the complexity in radius of curvature of the adjacent region of such desired shape.

15. The mold of claim 11 wherein the surface area of each one of said plurality of plates is inversely related to the complexity and radius of curvature of the portion of said surface of such desired shape it comprises.

16. The mold of claim 11 wherein said plates define apertures extending therethrough and further including a housing extending from said plurality of plates and defining a chamber.

17. A mold for forming glass in a plastic state into a desired shape comprising, in combination,
 a lattice-type support having
  a first plurality of parallel strips and
  a second plurality of parallel strips oriented perpendicularly to said first plurality of strips,
  said first and said second strips secured to one another and cooperatively conforming to a surface of such desired shape,
 a plurality of individual plates secured to one another and to said lattice-work support, each of said plates conforming to a portion of said surface of such desired shape,
 a plurality of apertures defined by said plurality of plates, and
 a housing extending from said plurality of plates, and defining a chamber enclosing said lattice-type support.

* * * * *